J. B. FERGUSON.
CLUTCH.
APPLICATION FILED OCT. 19, 1916.
1,205,954.
Patented Nov. 21, 1916.
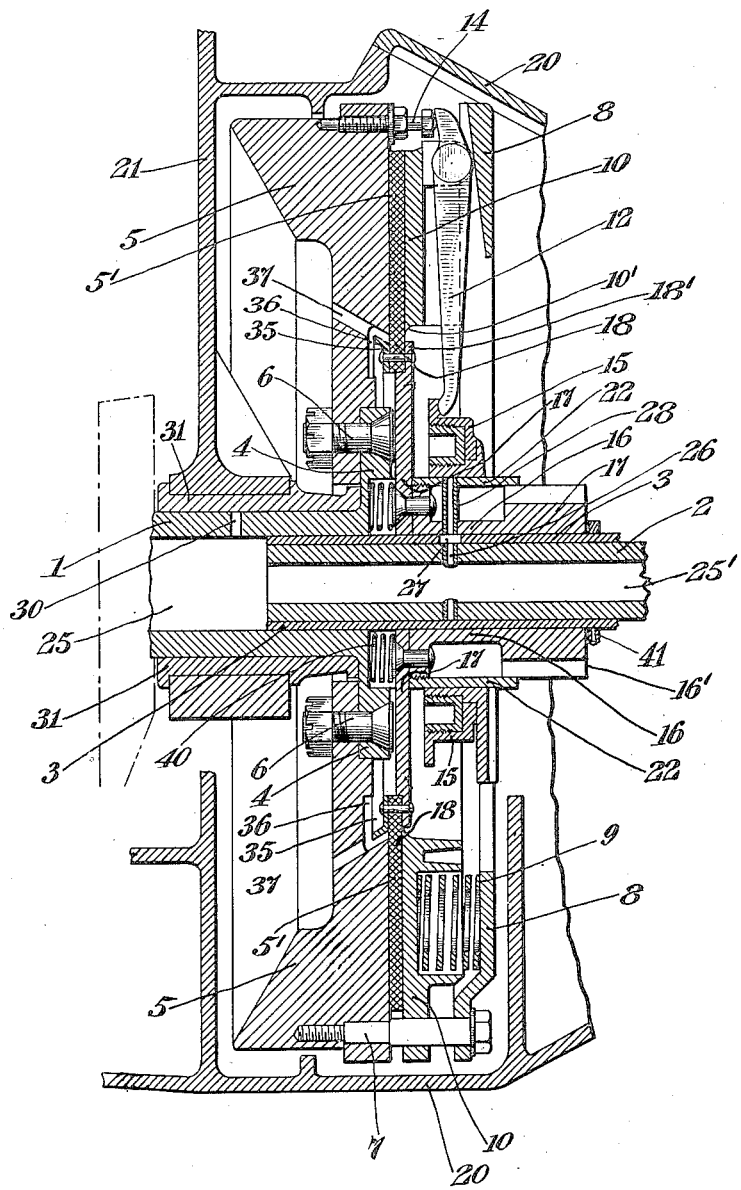

UNITED STATES PATENT OFFICE.

JOSEPH B. FERGUSON, OF NEW YORK, N. Y.

CLUTCH.

1,205,954.   Specification of Letters Patent.   Patented Nov. 21, 1916.

Application filed October 19, 1916. Serial No. 126,526.

*To all whom it may concern:*

Be it known that I, JOSEPH B. FERGUSON, a subject of the King of Great Britain, and a resident of New York city, county and State of New York, have invented certain new and useful Improvements in Clutches, of which the following is a specification.

This invention relates to clutches, and particularly to the construction and arrangement thereof whereby low inertia of the parts is secured, and whereby the parts may be properly lubricated.

An object of this invention is to provide a clutch having parts possessing low inertia, and a further object is to provide a lubricating system whereby the use of such parts is rendered practicable. In the attainment of these ends I provide a clutch wherein those parts positioned at the relatively great distances from the axis are of light material, and while I make provision for the lubrication of all desired parts of the clutch, I make provision for protecting from lubrication those parts from which it is desirable that oil should be kept away.

Other and further objects and advantages will appear from the following description, taken in connection with the accompanying drawing forming part of this specification, and will be pointed out in the hereunto appended claims.

The figure of the drawing represents a longitudinal sectional view of a clutch embodying my invention.

While I describe a specific embodiment of my invention, I do not intend that I shall be limited to the particular features herein illustrated and referred to, for this description is merely for the purpose of interpreting my invention which I intend shall be defined by the hereunto appended claims.

The clutch illustrated and described is particularly adaptable for use in connection with internal combustion engines, but my invention is not limited to such an application.

The crank shaft 1 is hollow and forms a bearing for the gear case shaft 2 which has on it the bronze bushing 3. To the flange 4 of the shaft 1 the fly wheel 5 is secured by means of bolts 6. Secured to the fly wheel 5 by studs 7 of which a plurality are arranged at intervals around the fly wheel, near its periphery, is a backing plate 8 against which presses one end of each of the coiled springs 9, of which there are a plurality. Mounted upon the studs 7 for sliding there is a compression plate 10 which comprises an annulus and which is acted upon by the other end of the springs 9. The fly wheel 5 is provided with an active face 5' directly opposite the face of the compression annulus 10. Levers 12, of which there are a plurality are pivoted on the annulus 10 and proportioned so that one end will act upon adjustable studs 14 in the periphery of the fly wheel, and the other end is acted upon by the withdrawing ring 15 so that a movement of the ring 15 to the right will draw the annulus 10 away from the face 5'.

The construction so far described constitutes one member of the clutch. The other member comprises a core 16 of as light a construction as is practicable journaled on the bushing 3, and having a flanged extension 17 to one face of which is attached an annulus 18 of material which has the least weight possible, while at the same time sufficient strength to transmit the torque, and in the preferred form I use such woven materials as "Ferodo" and "Raybestos". By my particular arrangement of clamping faces on the first member of the clutch I have been able to use material which is extremely light and therefore of low inertia, while I am able, at the same time, to transmit the desired torque. On the other end of the core 16 is formed the pinion 16' which is ordinarily positioned within the gear box which is attached to the clutch casing 20 mounted on the engine casing 21, as is usual in "unit power plant" constructions. There is also mounted on the core a ring 22 upon which the withdrawing ring 15 is journaled. In using a clutch of this type it is essential that the non-metallic material which is low in inertia, shall be kept free from oil and grease, but it is indispensable that the other parts of the clutch be well lubricated, and therefore I use, in combination with my non-metallic clutch annulus, means for deflecting oil away from its surfaces. Oil is fed through the opening 25 in the shaft 1, and the opening 25' in the shaft 2, and passes through the hole 26 in the shaft 2 and the hole 27 in the bushing 3, and thence through the tube 28 which passes through the core 16 and the ring 22. This oil is fed to the portion of the ring 22 on which the ring 15 is journaled. Oil passing through the opening 30 lubricates the main shaft bearing 31, and oil seeps between the shafts 1 and 2 to lubricate the bearing of shaft 2 within shaft 1. It will thus be seen that oil will reach both faces of the flange 18, and centrifugal force will throw it outward. I therefore provide an angular annular deflecting plate 35 which is fastened to one edge of the annulus 18 and which is positioned within groove 36 in the face of the flywheel. Oil will therefore be deflected by this plate into the groove 36, and will pass therefrom through passages 37 to the outward face of the fly wheel, and drop into the casing to be returned to the reservoir. Oil being thrown outward along the right-hand face of the plate 18, passes off the part 18' which projects above the surface of the annulus 18, and is thrown against the compression annulus 10 which has a curved edge 10' to lead the oil away from the annulus 18. The oil led away from the annulus 18 by the edge 10' passes through the openings in which are positioned the levers 12 and is caught by the clutch casing 20. It will therefore be seen that while sufficient oil is applied to all parts, means are provided for throwing it away from the non-metallic parts, and for catching it in the other member of the clutch.

Springs 40 throw one clutch member away from the other when the withdrawing ring 15 is moved to the right. A shoulder 41 limits the movement of the second clutch member to the right.

It will thus be seen that I have provided a clutch with parts having low inertia so that gear shifting will be simple, and the gears will not be injured thereby, and I have at the same time provided means for lubricating all parts of the clutch while keeping the non-metallic portion dry.

What I claim as new and desire to secure by Letters Patent, is:

1. In a clutch a first member comprising relatively movable parts and a second member comprising a core part and a radial disk secured to and extending therefrom and being positioned between the parts of said first member, said disk being composed substantially entirely of substantially non-metallic material such as Raybestos or its equivalent.

2. In a clutch a first member comprising relatively movable parts and a second part comprising a disk positioned between said parts, one of said parts having an annular groove in the face thereof adjacent said disk and passages leading from said groove to the opposite face of said part to conduct away oil collected in said groove.

In testimony whereof, I have signed my name to this specification.

JOSEPH B. FERGUSON.